2,963,504
Patented Dec. 6, 1960

2,963,504
ALKYL TOLUENE DIISOCYANATES

Jack H. Thelin, Somerville, and William B. Hardy, Bound Brook, N.J., assignors to American Cyanamid Company, New York, N.Y., a corporation of Maine No Drawing. Filed June 9, 1958, Ser. No. 740,533

1 Claim. (Cl. 260—453)

This invention relates to 2,6-diisocyanato-4-branched alkyltoluenes represented by the formula:

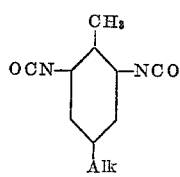

where Alk is a branched chain alkyl group such as isopropyl, isobutyl, tertiary butyl, secondary butyl, secondary amyl, tertiary octyl, etc. The present invention is not limited to compounds in which the branched chain alkyl group has 8 or less carbon atoms and includes those compounds in which the branched chain alkyl group has a larger number of carbon atoms, such as 12, 16 or 18. However, since the higher branched chain alkyl compounds do not have properties superior to those up to 8 carbon atoms, the latter constitute a preferred embodiment of the invention.

In general, the compounds of the invention are useful because of their adhesive properties and may be employed, for example, as tire cord bonding agents.

While the invention is not limited as far as the product claims are concerned, to any particular process by which they are prepared, it is an advantage of the present invention that a very simple process may be used by heating the corresponding 2,6-diamino-4-alkyl-toluenes with phosgene in a suitable inert solvent, such as for example, chlorobenzene, orthodichlorobenzene and the like. In a more specific aspect of the present invention, therefore, the preferred process is included.

The invention will be more fully described in the following specific examples in which the parts are by weight, unless otherwise specified.

*Example 1*

Fifteen parts of 2,6-diamino-tert-butyltoluene are dissolved in a mixture of orthodichlorobenzene and monochlorobenzene in the proportion of 2:1. Phosgene is introduced until the reaction is complete, raising to a temperature of about 150° C. The reaction mixture is then purged with nitrogen to remove all of the phosgene remaining, hot filtered and the solvent distilled off under a vacuum. The residue constitutes crude 2,6-diisocyanato-p-tert.-butyltoluene and is purified by redistillation. A white solid is obtained.

*Example 2*

310 parts of p-isopropyltoluene is added to 630 parts of 78% sulfuric acid. Then there is gradually added 216 parts of 69.9% nitric acid, 608 parts of 98% sulfuric acid and 17 parts of water. The addition is effected with agitation and the temperature maintained at 22–25° C. After the mixed acid is introduced, the stirring is continued for about twice the time of introduction, the temperature being maintained at 21° C. and the reaction is completed. 483 parts of an oil is obtained which is further nitrated by the addition of a mixture of 587 parts of 98% sulfuric acid at 63–68° C. followed by the addition of 250 parts of 65% oleum, 179 parts of 81% nitric acid and 28 parts of water. Continuous agitation and cooling is required and the agitation is maintained until the dinitration is complete. The reaction mixture then separates into an oil layer and a water layer, the oil layer being separated off, washed with water, cooled to precipitate out a solid product which is removed by filtration. The product is then recrystallized from alcohol to yield a good quality 2,6-dinitro-4-isopropyltoluene.

*Example 3*

To 36 parts of the 2,6-dinitro-4-isopropyltoluene dissolved in 157 parts of anhydrous ethanol there is added 1 part of a catalyst prepared by the deposition of palladium on carbon to about 10% palladium content. The reaction mixture is introduced into a hydrogenation apparatus and hydrogen introduced to reduce the nitro compound of the corresponding 2,6-diamino compound. The catalyst is then filtered off from the reaction medium and the ethanol evaporated yielding the free amine which is then dissolved in benzene and precipitated with hydrochloric acid as a hydrochloride.

*Example 4*

The procedure of Example 1 is repeated using 15 parts of the product of Example 3 in place of the diamino p-tert-butyltoluene. A good yield of 2,6-diisocyanato-4-isopropyltoluene is obtained.

*Example 5*

The procedure of Examples 2, 3 and 4 are repeated replacing the p-isopropyltoluene of Example 2 with an equivalent amount of p-sec-octyltoluene. The corresponding 2,6-diisocyanato-4-sec-octyltoluene is obtained.

*Example 6*

The compound prepared in Example 1 was tested in a 10% rubber-in-toluene cement for adhesion properties as a tire cord bonding agent. Nylon cord was treated with three coats of cement containing 3.68 grams of the compound of Example 1 per 100 grams of cement and the treated cord was cured into a natural rubber tire carcass stock. A piece of cord was treated in the same way but using cement containing none of the added agent. The cured cord was then pulled out in pairs with the following result:

Average adhesion in grams
Untreated nylon cord, no agent in cement _____ 250
Using 3.68 grams of product per 100 grams of cement _____ 486
Percent improvement over untreated cord _____ 95

We claim:
2,6-diisocyanato-4-tertiary butyltoluene.

References Cited in the file of this patent
UNITED STATES PATENTS
2,642,449     Morningstar et al. _____ June 16, 1953
FOREIGN PATENTS
761,113     Great Britain _____ Nov. 7, 1956
OTHER REFERENCES
Siefkin, Justus Liebigs Annalen der Chemie, vol. 562, 1949, page 127.